(12) United States Patent
Mape et al.

(10) Patent No.: US 11,635,634 B2
(45) Date of Patent: *Apr. 25, 2023

(54) BUTTON ASSEMBLY AND METHOD OF MANUFACTURING THEREOF

(71) Applicant: Snap Inc., Santa Monica, CA (US)

(72) Inventors: Martin Mape, Marina Del Rey, CA (US); Douglas Wayne Moskowitz, Marina Del Rey, CA (US); Stephen Andrew Steger, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/377,970

(22) Filed: Jul. 16, 2021

(65) Prior Publication Data

US 2022/0107506 A1 Apr. 7, 2022

Related U.S. Application Data

(63) Continuation of application No. 16/293,344, filed on Mar. 5, 2019, now Pat. No. 11,086,139.

(Continued)

(51) Int. Cl.
*G02C 5/00* (2006.01)
*G02C 5/14* (2006.01)
(Continued)

(52) U.S. Cl.
CPC ........ *G02C 5/001* (2013.01); *B29C 45/14336* (2013.01); *B29D 12/02* (2013.01);
(Continued)

(58) Field of Classification Search
CPC .......... G02C 5/011; G02C 5/146; G02C 9/00; G02C 11/10; G02C 13/001;
(Continued)

(56) References Cited

U.S. PATENT DOCUMENTS 5,448,028 A 9/1995 Filion et al.
9,482,883 B1 * 11/2016 Meisenholder ........ G02C 5/146
(Continued)

FOREIGN PATENT DOCUMENTS

CN 111819060 10/2020
CN 111819060 7/2022
(Continued)

OTHER PUBLICATIONS

"Chinese Application Serial No. 201980017496.4, Response Filed Feb. 8, 2022 to Office Action dated Sep. 24, 2021", W English Claims, 15 pgs.

(Continued)

*Primary Examiner* — William R Alexander
*Assistant Examiner* — Sharrief I Broome
(74) *Attorney, Agent, or Firm* — Schwegman Lundberg & Woessner, P.A.

(57) ABSTRACT

A method of manufacturing a button-enabled housing assembly includes pre-forming a composite button component or insert having an elastically flexible button membrane that is mounted on a rigid frame, and thereafter molding a housing over the button insert. The composite button insert is formed in a co-molding operation and can include a rigid island in the flexible button membrane for supporting a cosmetic keycap.

20 Claims, 6 Drawing Sheets

Related U.S. Application Data

(60) Provisional application No. 62/638,669, filed on Mar. 5, 2018.

(51) Int. Cl.
| | |
|---|---|
| *G02C 11/00* | (2006.01) |
| *G02C 9/00* | (2006.01) |
| *B29C 45/14* | (2006.01) |
| *B29D 12/02* | (2006.01) |
| *G02C 13/00* | (2006.01) |
| *B29L 12/00* | (2006.01) |
| *G02B 27/01* | (2006.01) |
| *B29L 31/34* | (2006.01) |
| *B29L 31/46* | (2006.01) |

(52) U.S. Cl.
CPC ............... *G02C 5/146* (2013.01); *G02C 9/00* (2013.01); *G02C 11/10* (2013.01); *B29L 2012/005* (2013.01); *B29L 2031/3481* (2013.01); *B29L 2031/466* (2013.01); *G02B 2027/0178* (2013.01); *G02C 13/001* (2013.01)

(58) Field of Classification Search
CPC .............. B29C 45/14336; B29D 12/02; B29L 2012/005; B29L 2031/3481; B29L 2031/466

See application file for complete search history.

(56) References Cited

U.S. PATENT DOCUMENTS

| | | | | |
|---|---|---|---|---|
| 11,086,139 | B2 | 8/2021 | Mape et al. | |
| 2002/0101738 | A1 | 8/2002 | Misaras | |
| 2005/0248719 | A1* | 11/2005 | Howell .................. | G02C 5/001 351/41 |
| 2006/0175858 | A1* | 8/2006 | Pegorier ............... | B60R 21/045 296/70 |
| 2009/0173613 | A1 | 7/2009 | Geldmacher | |
| 2011/0042848 | A1* | 2/2011 | Ash .................. | B29C 45/14311 264/265 |
| 2012/0147317 | A1* | 6/2012 | Loeb, Jr. .................. | G02C 7/06 351/159.43 |
| 2014/0054919 | A1* | 2/2014 | Oeuvrard ............... | B60K 37/06 296/70 |
| 2014/0239781 | A1 | 8/2014 | Allore et al. | |
| 2016/0252727 | A1 | 9/2016 | Mack et al. | |
| 2017/0349118 | A1* | 12/2017 | Gonnet .................. | B60R 13/04 |
| 2019/0271856 | A1 | 9/2019 | Mape et al. | |

FOREIGN PATENT DOCUMENTS

| | | |
|---|---|---|
| CN | 115246197 | 10/2022 |
| EP | 1054420 | 11/2000 |
| FR | 2937932 | 5/2010 |
| KR | 102383016 | 4/2022 |
| KR | 102445199 | 9/2022 |
| WO | 2019173359 | 9/2019 |

OTHER PUBLICATIONS

"Chinese Application Serial No. 201980017496.4, Office Action dated Feb. 25, 2022", With English translation, 7 pgs.
"International Application Serial No. PCT US2019 020782, International Search Report dated May 9, 2020", 5 pgs.
"International Application Serial No. PCT US2019 020782, Written Opinion dated May 9, 2020", 6 pgs.
"International Application Serial No. PCT US2019 020782, International Preliminary Report on Patentability dated Sep. 17, 2020", 8 pgs.
"U.S. Appl. No. 16/293,344, Non Final Office Action dated Nov. 25, 2020", 14 pgs.
"U.S. Appl. No. 16/293,344, Response filed Mar. 25, 2021 to Non Final Office Action dated Nov. 25, 2020", 9 pgs.
"U.S. Appl. No. 16/293,344, Notice of Allowance dated Apr. 9, 2021", 9 pgs.
"European Application Serial No. 19711789.8, Response filed Apr. 15, 2021 to Communication pursuant to Rules 161(1) and 162 EPC dated Oct. 13, 2021", 31 pgs.
"Korean Application Serial No. 10-2020-7027948, Notice of Preliminary Rejection dated Jun. 22, 2021", w English Translation, 6 pgs.
"Korean Application Serial No. 10-2020-7027948, Response filed Aug. 4, 2021 to Notice of Preliminary Rejection dated Jun. 22, 2021", w English Claims, 27 pgs.
"Chinese Application Serial No. 201980017496.4, Office Action dated Sep. 24, 2021", w English Translation, 11 pgs.
U.S. Appl. No. 16/293,344 U.S. Pat. No. 11,086,139, filed Mar. 5, 2019, Button Assembly and Method of Manufacturing Thereof.

\* cited by examiner

BUTTON ASSEMBLY AND METHOD OF MANUFACTURING THEREOF

CLAIM OF PRIORITY

This application is a continuation of U.S. patent application Ser. No. 16/293,344, filed Mar. 5, 2019, which claims the benefit of priority to U.S. Provisional Application Ser. No. 62/638,669, filed Mar. 5, 2018, each of which are incorporated by reference herein in their entireties.

BACKGROUND

Many electronic products provide one or more functions that can be selected by manual user operation of a push button mechanism. In some such products, resilient return of the push button subsequent to pressing is effected by a resilient membrane or elastomer gasket that is deformed when the button is pressed.

Such button membranes in many applications additionally provide for sealing closure of a housing on which the button is mounted. The button membrane is often a molded component that is bonded to the housing to provide such sealing engagement.

Cost effective and reliable molding of a button membrane on to a housing or enclosure is, however, often frustrated by complex or inaccessible housing geometries. A further difficulty often experienced with such conventional button assemblies is suboptimal adhesion compatibility of an elastomeric material for the membrane with hard plastics materials typically used for molded housings or enclosures.

BRIEF DESCRIPTION OF THE DRAWINGS

The appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings.

Figure 1:
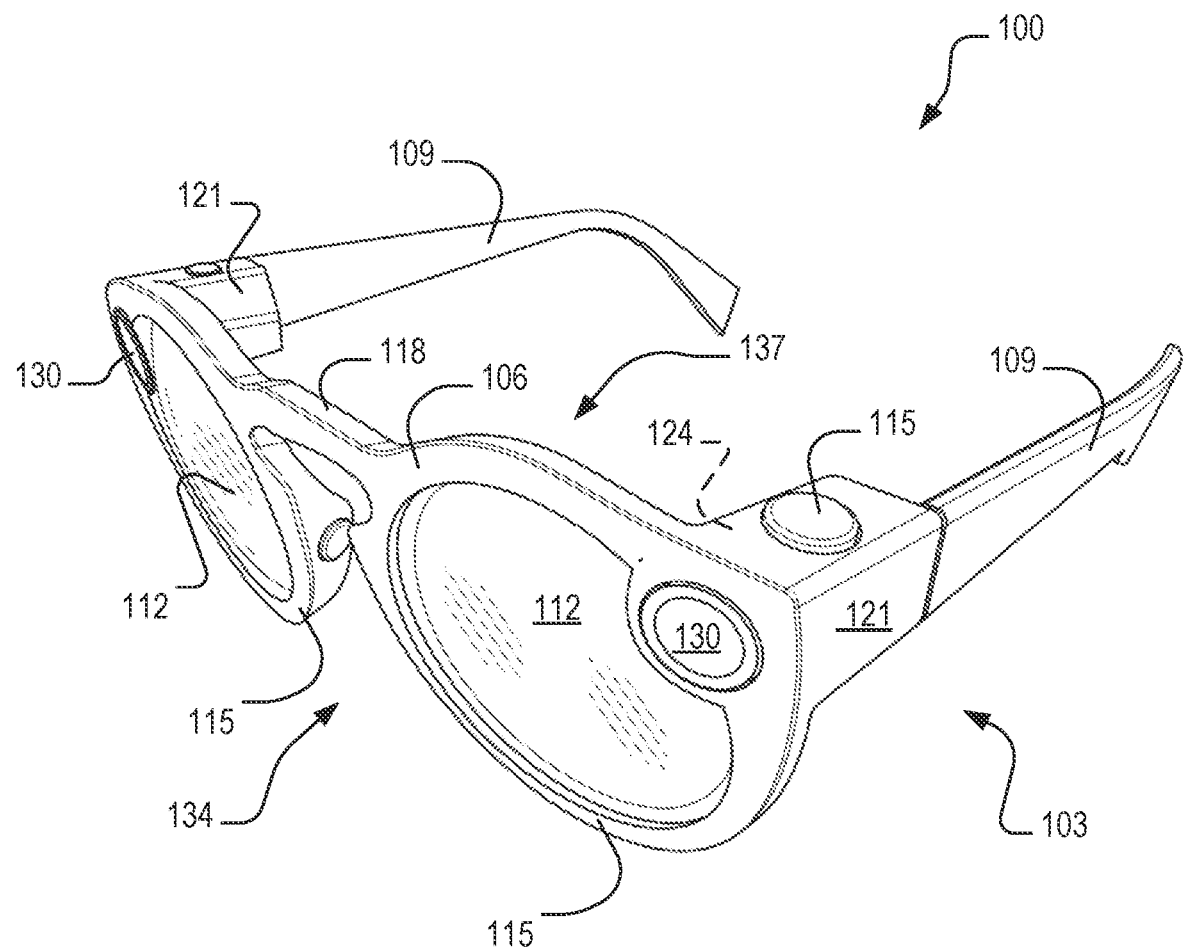
FIG. 1 is a schematic of a three-dimensional view of an electronics-enabled device in the form of a pair of smart glasses having one or more functionalities operable by use of a pair of push buttons mounted on a frame of the eyewear device, according to an example embodiment.

The headings provided herein are merely for convenience and do not necessarily affect the scope or meaning of the terms used.

OVERVIEW

One aspect of the disclosure provides for pre-forming a composite button component or insert comprising an elastically flexible button membrane mounted on a rigid frame, and thereafter molding a housing over the button insert. In some embodiments, the composite button insert is formed in a co-molding operation.

With "rigid" or "substantially rigid" in this description is meant that the relevant material or component has a rigidity such that it does not display readily discernible deformation or change in shape when exposed to a force in the order of a manual button press operation. Such materials are also referred to herein as hard plastics materials. In contrast, "flexible" and "deformable" means that the relevant material or component does display readily discernible deformation or change in shape when exposed to a force in the order of a manual button press operation.

Worded differently, an aspect of the disclosure provides a method comprising:
forming a button insert that comprises:
  a button frame that defines an access opening extending therethrough, the button frame being of a substantially rigid plastics material; and
  a button membrane attached to the button frame and covering at least part of the access opening through the button frame, the button membrane being of a resiliently flexible material; and
overmolding a housing for electronics components on to the composite button insert such that the housing is bonded to the button frame, with the button membrane being located in a button aperture defined by the housing, the button aperture being closed off by the button insert.

In some embodiments, the button insert is substantially watertight. The overmolding operation in such embodiments establishes a substantially watertight connection between the button insert and the housing, so that button insert seals off the button aperture of the housing. In some embodiments, the button frame is integrated in a wall of the housing, so that the material of the housing is bonded to a peripheral edge of the button frame.

In some embodiments, the forming of the button insert comprises molding the button frame, and overmolding the button membrane on to the button frame. This is in some embodiments performed in a co-molding operation, e.g., in a double-shot mold.

The co-molding operation is in some embodiments such that the button insert further comprises a hard island or cap platform bonded to the flexible button membrane to be displaceable relative to the button frame upon resilient deformation of the button membrane. The hard island is in such embodiments of a substantially rigid plastics material and is located in register with the button aperture defined by the housing.

The method may in some embodiment include attaching a button cap to the hard island, the button cap providing an interface for manual user interaction. In some such embodiments, the button cap is attached to the hard island or cap platform in an ultrasonic bonding operation. In other embodiments, an adhesive bond is formed between the button cap and the hard island, e.g., by application of a liquid glue.

Further aspects of the disclosure provide for a housing assembly formed according the above-described method, and for an electronic device having such a housing assembly incorporated therein.

DETAILED DESCRIPTION

The description that follows includes devices, systems, methods, and techniques that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

FIG. 1 shows an oblique front view of an electronics-enabled device in the example form of an eyewear device 100 that is at least in part button-operated. The eyewear device 100 includes a body 103 comprising a front piece or frame 106 and a pair of temples 109 connected to the frame 106 for supporting the frame 106 in position on a user's face when the eyewear device 100 is worn. The frame 106 is in this example embodiment at least partially provided by one or more molded components formed of a substantially rigid polymeric plastics material.

The eyewear device 100 has a pair of optical elements in the form of a pair of optical lenses 112 held by corresponding optical element holders in the form of a pair of lens rims 115 forming part of the frame 106. The rims 115 are connected by a bridge 118, In other embodiments, of one or both of the optical elements can be a display, a display assembly, or a lens and display combination. The eyewear device 100 can, in such embodiments, provide a virtual reality headset or an augmented reality display.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction. In this example embodiment, as will be seen in greater detail below with reference to FIGS. 2-5, each end piece 121 is formed by a separate molded plastics component.

In this description, directional terms such as front, back, forwards, rearwards, outwards and inwards are to be understood with reference to a direction of view of a user when the eyewear device 100 is worn. Thus, the frame 106 has an outwardly directed front side 134 facing away from the user when worn, and an opposite inwardly directed rear side 137 side facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal or lateral direction of the eyewear device 100 thus extends more or less between the end pieces 121, while a vertical or upright direction of the eyewear device 100 extends transversely to the horizontal direction, such that the lenses 112 have a more or less vertical or upright orientation.

The eyewear device 100 has onboard electronics 124 including a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (in this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital still as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121. The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a push button mechanism 115 mounted on the frame 106 so as to be accessible on top of one of the end pieces 121 for pressing by the user.

Figure 2:
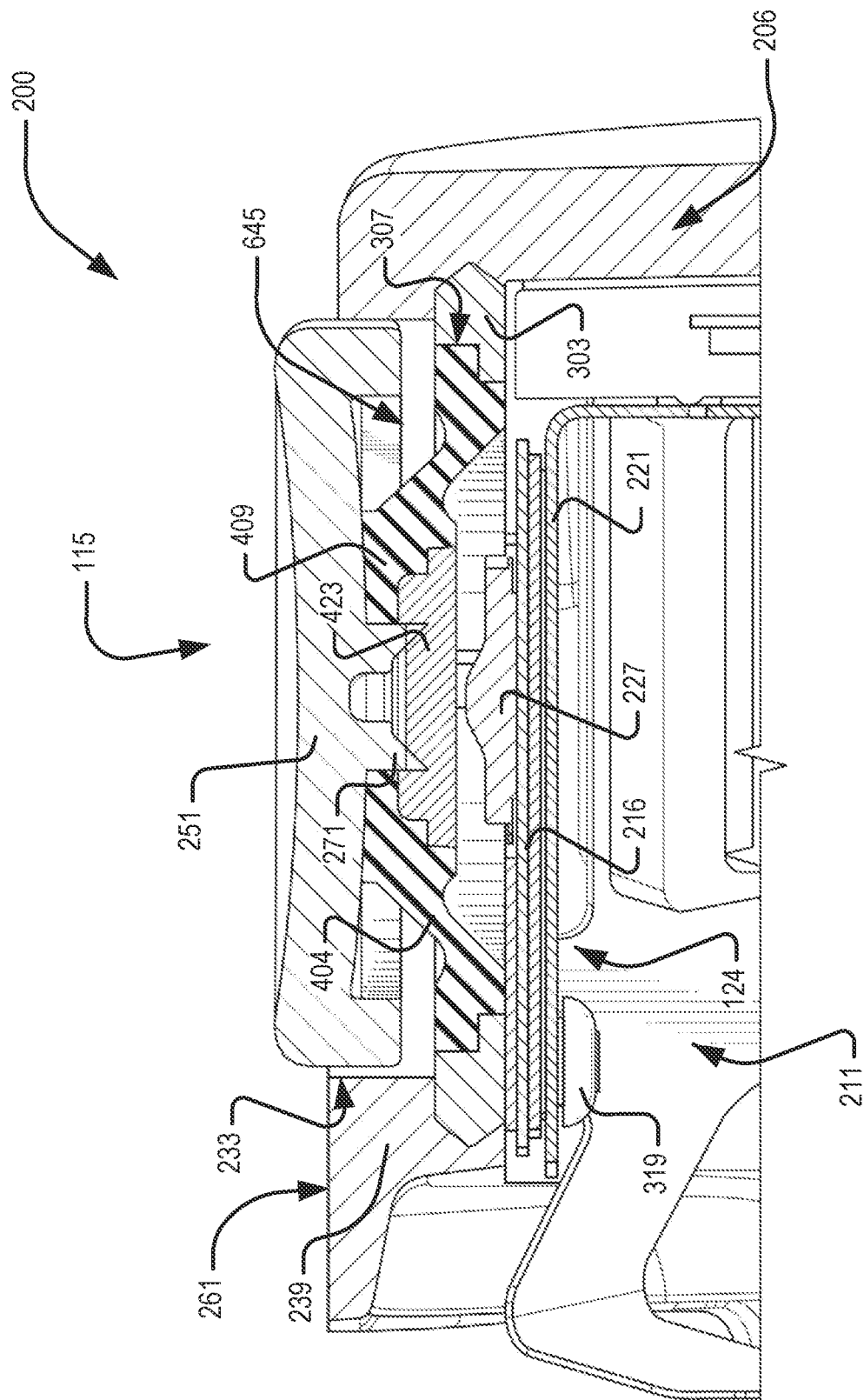
FIG. 2 is a schematic cross-sectional view of a housing assembly for incorporation in a frame of an example electronics-enabled device according to FIG. 1, the housing assembly including a preformed co-molded button insert on to which the housing has been over molded, according to an example embodiment.

FIG. 2 shows a partial cross-section of a housing assembly 200 configured for incorporation in an electronic device in the example form of the eyewear device 100 of FIG. 1. In this example embodiment, the housing assembly 200 is configured for providing one of the end pieces 121 of the eyewear device 100. The housing assembly 200 includes a housing 206 on which the button mechanism 115 is mounted. The housing 206 has a hollow interior defining a housing cavity 211 in which the relevant electronic components 124 are enclosed. In this example embodiment, the electronic components 124 includes a printed circuit board (PCB) 216 supported in the housing cavity 211 by a metal support bracket 221. The PCB 216 includes a push switch 227 mounted on the PCB 216 such that it faces towards the button mechanism 115 for activation thereby.

The button mechanism 115 is located in a circular button aperture 233 defined by a top wall 239 of the housing 206, the button aperture 233 being in register with the push switch 227 mounted on the PCB 216, The button aperture 233 is sealingly closed off by a composite button insert 645 on to which the housing 206 is overmolded, as will be described in greater detail with reference to FIG. 6.

Figure 3:
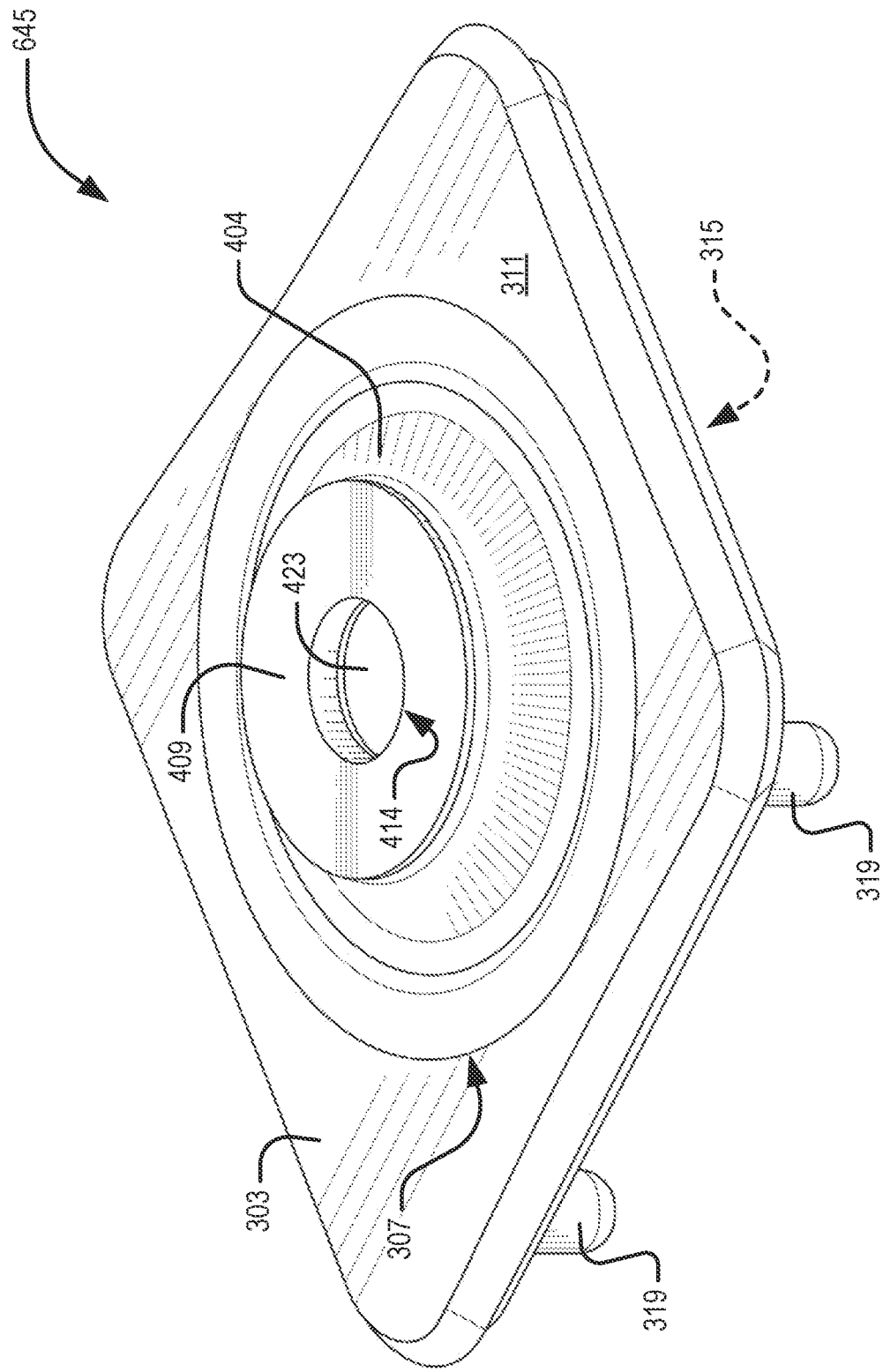
FIG. 3 is an isolated three-dimensional view of a co-molded button insert according to the example embodiment of FIG. 2.

The construction of the button insert 645, which is a co-molded component, preformed for incorporation thereof into the housing 206, will now be briefly described with reference to FIGS. 3 and 4. Turning to FIG. 3, it will be seen that the button insert 645 includes a button frame 303 which, in this example embodiment, is a more or less square tile-shaped component. The button frame 303 is of a substantially rigid polymeric plastics material and defines a circular central opening 307 that provides access for engagement with the push switch 227 (FIG. 2). The button frame 303 has a pair of oppositely directed major outer faces in the form of an operatively outer face 311 and an operatively inner face 315, the major outer faces 311, 315 being connected by a peripheral edge face extending transversely between them.

The inner face 315 of the button frame 303 defines a mounting formation in the example form of a set of heat stakes 319 that project transversely away from the inner face 315. Turning again briefly to FIG. 2, it will be seen that the heat stakes 319 are used in the mounting of one or more of the electronic components 124. In this example embodiment, the heat stakes 319 are employed in the mounting of PCB 216, passing through complementary registering openings in the PCB 216 and the metal support bracket 221. Exposed heads of the heat stakes 319 are deformed to lock the PCB 216 and the support bracket 221 in place relative to the button frame 303, rivet fashion.

Figure 4:
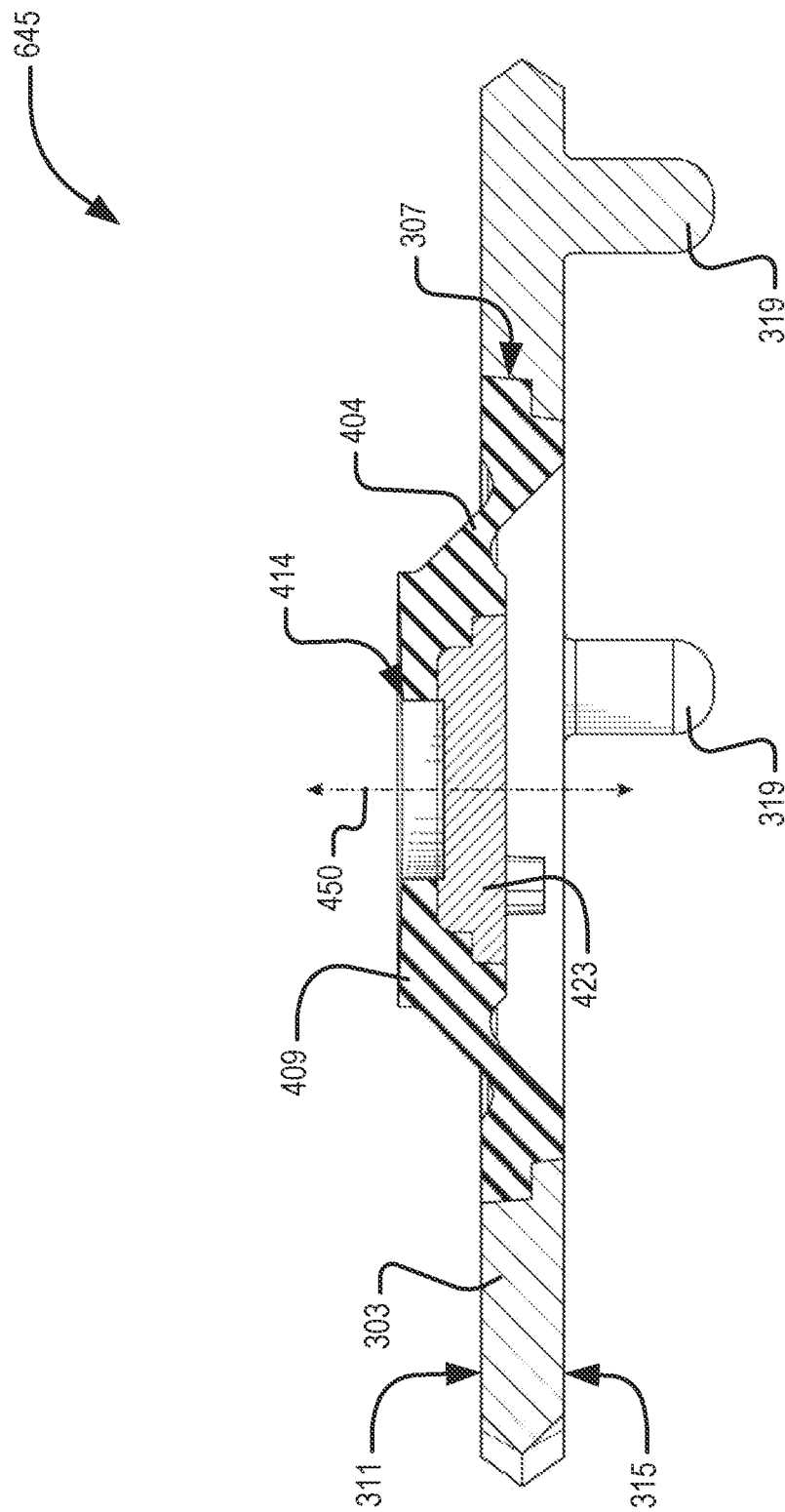
FIG. 4 is an isolated cross-sectional view of a button insert according to the example embodiment of FIG. 3.
Figure 5:
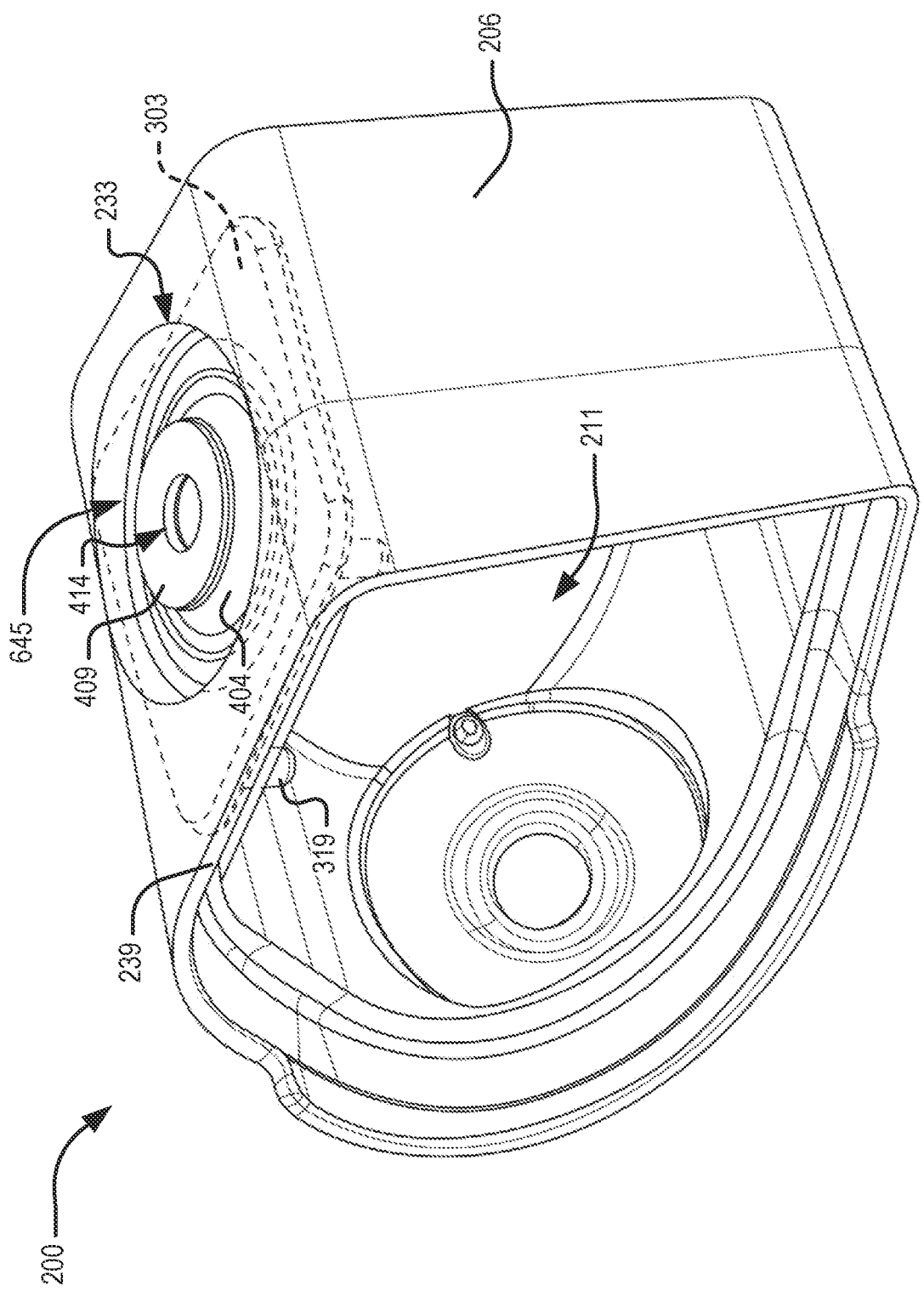
FIG. 5 is a three dimensional view of a housing assembly for incorporation in an electronics-enabled device such as that according to the example embodiment of FIG. 1, prior to attachment of a button cap to the button insert, and prior to mounting of electronic components in an interior of the housing assembly.

Turning now to FIG. 4, it will be seen that the button insert 645 further comprises a button membrane 404 attached to a radially inner periphery of the button frame opening 307, thus being located within the opening 307. The button membrane 404 is a generally annular member that is broadly cup-shaped, so that a central boss 409 stands proud of the outer face 311 of the button frame 303. The membrane 404 is of a resiliently deformable polymeric plastics material, in this example embodiment being of a molded elastomeric material, so that the central boss 409 of the button membrane 404 is resiliently displaceable back-and-forth in a direction transverse to the button frame 303, as indicated by arrows 450 in FIG. 4. The central boss 409 of the button membrane 404 further defines a central circular hole 414 that extends transversely therethrough. As can best be seen in FIG. 4, an operatively upper surface of the central boss 409 has a concavely curved depression that forms a seat for the underside of a cosmetic key cap or button cap 251 (FIG. 2).

As can also be seen in FIG. 4, the button insert 645 further includes a floating cap platform 423 provided by a hard island of a rigid plastics material, in this example embodiment, the cap platform 423 and the button frame 303 are of the same hard plastics material. The cap platform 423 is a stepped, circular disc-shaped component that is located centrally in the opening 307 of the button frame 303, and is bonded with the button membrane 404 such that the central hole 414 of the button membrane 404 is sealingly closed off by the cap platform 423. It will thus be seen that the access opening 307 defined by the button frame 303 is sealingly closed off by the combination of the button membrane 404 and the cap platform 423.

As will be described in greater detail with reference to FIG. 6, the button insert 645 is a preformed co-molded component, with the elastomeric button membrane 404 being adhesively bonded to both the cap platform 423 and the button frame 303 in a co-molding operation. With "preformed" in this context is meant that the button insert 645 is formed prior to overmolding of the housing 206 onto the button frame 303.

Returning now to FIG. 2, it will be seen that the button mechanism 115 further includes a button cap 251 mounted on the button insert 645 to provide an interface for receiving manual actuation by the user. To this end, an upper surface of the button cap 251 defines a gently curved depression complementary to a convex underside of the button cap 251. The button cap 251 has a circular outline and is located with peripheral clearance in the button aperture 233 such as to stand proud of an upper surface 261 of the top wall 239 of the housing 206, when the button membrane 404 is in an unstressed position in which it is not depressed (as shown in FIG. 2).

A lower surface of the button cap 251 has a centrally located axial projection or spigot 271, The spigot 271 extends axially through the central hole 414 in the button membrane 404 and is fixedly connected to the cap platform 423. In this manner, the button cap 251 is attached to the button insert via the cap platform 423.

In operation, the button mechanism 115 is activated by the user's pressing of the button cap 251 downwards (when the device 100 is oriented as shown in FIG. 2). Such depression causes the cap platform 423 to move inwards, towards the housing cavity 211, bringing the cap platform 423 into contact with the push switch 227 and thus activating the switch 227. During such pressing of the button, the button membrane 404 is resiliently or elastically deformed. When the user releases the button cap 251, the button membrane 404 returns elastically to its unstressed position (FIG. 2), thus moving the cap platform 423 outwards, out of contact with the push switch 227.

Note that some embodiments has no hard island such as the cap platform 423, with the button cap 251 being mounted directly on the membrane 404 (which can in such cases be uninterrupted by a central opening), In yet further embodiments, the assembly can function without a key cap such as button cap 251, with the user pressing directly on the membrane 404 to activate a switch such as push switch 227.

Note that the structure of the button mechanism 115, and the various bonded connections of the different parts of the button mechanism 115, as well as the overmolded connection between the button insert 645 and the housing 206, is such as to render the button mechanism 115 substantially watertight, preventing ingress of water into the housing cavity 211 through the button aperture 233. The elastically resilient button membrane 404 provides a spring action for button presses, rendering excellent tactility and re-centering.

Figure 6:
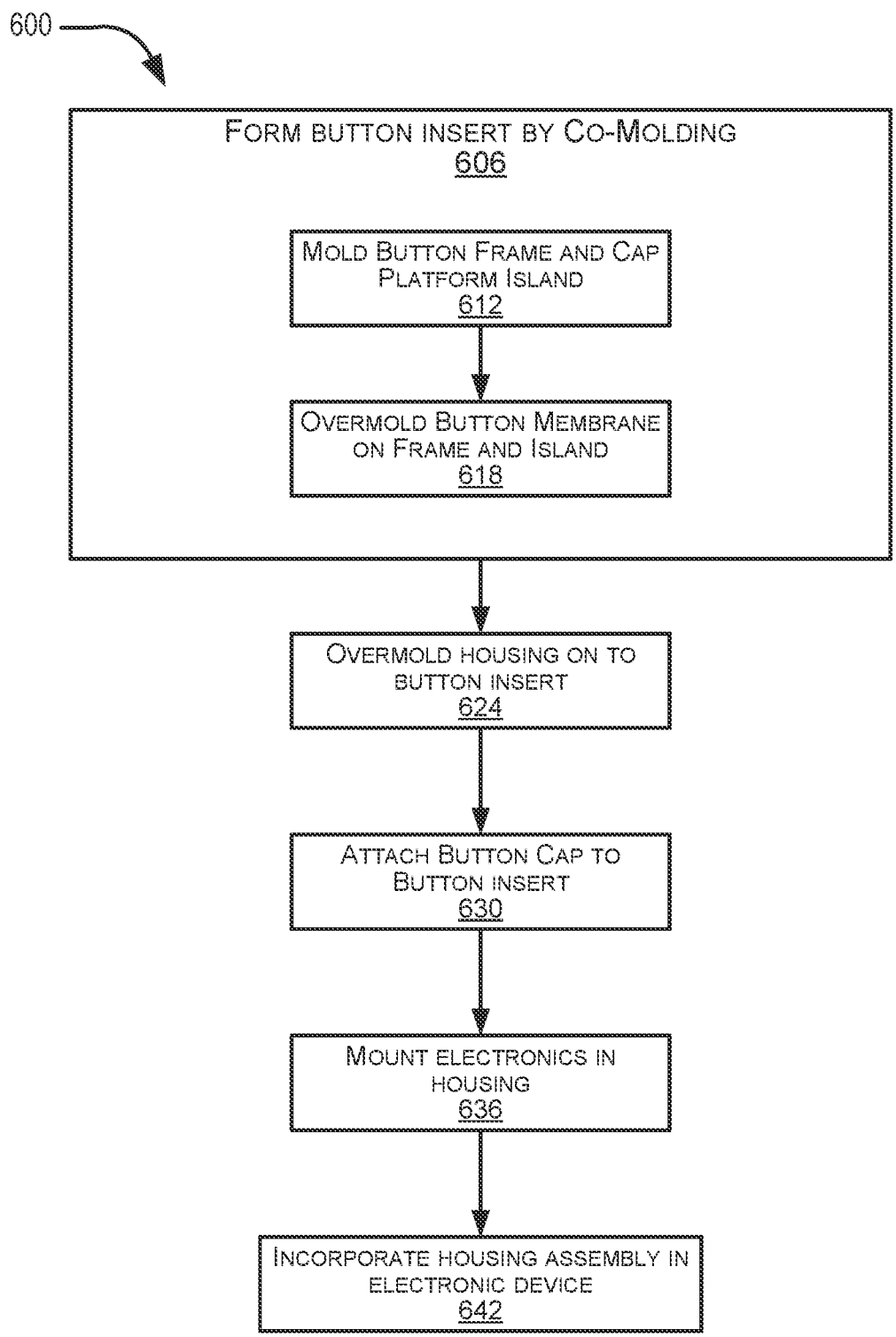
FIG. 6 is a schematic flow diagram illustrating an example embodiment of a method for manufacturing a button-enabled housing assembly according to an example embodiment.

Turning now to FIG. 6, therein is shown a schematic flowchart for a method 600 of forming a button-enabled housing assembly and an electronic device incorporating the housing assembly, according to one example embodiment. The method 601 in this example is described with reference to the housing assembly 200 and eyewear device 100 according to the example embodiment described with reference to FIGS. 1-5.

At operation 606, the composite button insert 645 is formed in a co-molding operation. In this example embodiment, the forming of the button assembly or insert 645 comprises a double-shot molding procedure in which the flexible button membrane 404 is overmolded on to the hard plastic parts providing the button frame 303 and the floating cap platform 423, Thus, the formation of the button insert 645, at operation 606, comprises first, at operation 612, injection molding the button frame 303 and the cap platform 423 in the double-shot mold, and thereafter, at operation 618, overmolding the button membrane 404 from a different, elastomeric plastics material onto the hard plastic parts.

At operation 624, the button insert 645 is connected to the housing 206 in an insert-molding operation, in which the housing 206 is overmolded on to the periphery of the button frame 303, to establish integration of the button insert 645 into a wall 239 of the housing 206, as can best be seen in FIG. 2.

Thereafter, the button cap 251 is attached to the button insert 645, at operation 630. In this example embodiment, such attachment is achieved by passing the axial spigot 271 of the button cap 251 through the central hole 414 of the button membrane 404, and connecting the spigot 271 of the button cap 251 to the cap platform 423. In this example embodiment, the button cap 251 is attached to the cap platform 423 by ultrasonic welding. In other embodiments, the spigot 271 of the button cap 251 may be connected to the cap platform 423 by liquid adhesive, or by any other suitable connection mechanism.

One or more electronic components are thereafter mounted in the housing cavity 211 of the housing 206, at operation 636. In this example embodiment, such mounting comprises passing mounting openings in the PCB 216 and the mounting bracket 221 through the heat stakes 319 of the button insert 645, and thereafter deforming the exposed heads of the heat stakes 319 to fixedly locate the PCB 216 in position. Finally, at operation 642, the housing assembly 200 thus formed is incorporated into the eyewear device 100.

It is a benefit of the described techniques that they provide for a wider range of material selection for elastomers and plastics to be used in the design than is the case for existing mechanisms. This is in part due to connection of the button membrane 404 to the housing 206 via the button frame 303. It is often the case that an elastomer suitable for the button membrane 404 has suboptimal adhesion compatibility with a hard plastics material suitable for the housing 206. Such adhesion compatibility between the button membrane 404 and the housing 206 can necessitate selection of suboptimal materials for the membrane 404 or the housing 206, or can jeopardize integrity of water resistant sealing of the housing 206 at the button aperture 233. The disclosed techniques provide solutions to these problems by enabling the selection of the material of the button frame 303 to have respective adhesion compatibilities with the button membrane 404 and with the housing 206 that are better than the direct adhesion compatibility between the button membrane 404 and the housing 206. In this manner, ease of manufacture is improved, while reliability and integrity of the connection between the button membrane 404 and housing 206 are improved.

A further benefit of some embodiments of the described button mechanism 115 is the provision of the hard cap platform 423, which not only achieves easier and more reliable pressing of the push switch 227, but also facilitates attachment of the cosmetic button 251 to the button membrane 404. In particular, the hard plastic cap platform 423 provides a location for ultrasonic welding or other bonding of the cosmetic plastic keycap 251 to the hard plastic island 423.

Yet a further benefit of the described button mechanism 115 is that it minimizes overall size of the button assembly, and allows for the button membrane 404 to be substantially hidden from view. Additionally, modifications to the size, shape, and material of the button membrane 404 can easily be made with no or minimal effect on the size or shape of the component providing the button frame 303.

Still a further benefit of the described techniques is that they provide for simplification of mold tooling and reduction of the risk of cosmetic damage caused by conventional methods. Thus, for example, the button mechanism design allows for the co-molded membrane 404 to be located where its molding would otherwise be extremely challenging in a traditional double-shot or insert molding application.

An additional benefit is that the button insert design allows for the button insert 645 to provide functional features and such as heat stake posts, snaps, or other recesses and protrusions, which might otherwise be difficult to form in the housing 206.

Thus, by having the elastomer pre-molded as part of the button insert 645, the disclosure avoids many limitations of trying to mold the elastomer membrane 404 directly onto the enclosure housing 206, These limitations include, as previously discussed:

Adhesion compatibility of molding the elastomer on to the housing 206, The material used for the button frame 303 and the cap platform 423 can be selected for molding compatibility with the elastomer of the button membrane 404; and some enclosure geometries make direct molding of an elastomer membrane on to the housing component technically difficult or add high-level risk to cosmetics or yield.

It will be seen that, the foregoing description illustrate some example embodiments of the disclosure. A selection of the disclosed example embodiments is listed below. Note that the number embodiments recited below are non-exhaustive.

EXAMPLE 1

A method comprising:
forming a button insert that comprises:
 a button frame that defines an access opening extending therethrough, the button frame being of a substantially rigid plastics material; and
 a button membrane attached to the button frame and covering at least part of the access opening through the button frame, the button membrane being of a resiliently flexible material; and
overmolding a housing for electronics components on to the composite button insert such that the housing is bonded to the button frame, with the button membrane being located in a button aperture defined by the housing, the button aperture being closed off by the button insert.

EXAMPLE 2

The method of example 1, wherein the button insert is substantially watertight, and wherein the overmolding operation establishes a substantially watertight connection between the button insert and the housing, so that button insert seals off the button aperture of the housing.

EXAMPLE 3

The method of example 1 or example 2, wherein the forming of the button insert comprises: molding the button frame; and
overmolding the button membrane on to the button frame.

EXAMPLE 4

The method of any one of examples 1-3, wherein the button insert is formed in a co-molding operation comprising the molding of the button frame and the overmolding of the button membrane on to the button frame.

EXAMPLE 5

The method of example 4, wherein the co-molding operation is such that the button insert further comprises a hard island bonded to the flexible button membrane to be displaceable relative to the button frame responsive to resilient deformation of the button membrane, the hard island being of a substantially rigid plastics material and being located in register with the button aperture defined by the housing.

EXAMPLE 6

The method of example 5, further comprising attaching a button cap to the hard island, the button cap providing an interface for manual user interaction.

EXAMPLE 7

The method of example 6, wherein the attaching of the button cap to the hard island comprises an ultrasonic bonding operation.

EXAMPLE 8

The method of example 6, wherein attachment of the button cap to the hard island comprises forming an adhesive bond between the button cap and the hard island.

EXAMPLE 9

The method of example any one of examples 1-8, wherein the button frame has a substantially flat body portion, the access opening being defined by the body portion and being substantially circular.

EXAMPLE 10

The method of any one of examples 1-9, wherein:
the button frame defines a pair of oppositely facing major faces connected by a peripherally extending edge face, the pair of major faces comprising an outer face that is bonded to a wall of the housing in the overmolding operation, and an inner face directed to an interior of the housing; and
wherein the inner face of the button frame defines a mounting formation configured for the attachment of one or more electronics components in the housing to the button frame.

EXAMPLE 11

The method of example 10, wherein the mounting formation comprises a heat stake configured for connection to a printed circuit board (PCB).

EXAMPLE 12

The method of example any one of examples 1-11, wherein the membrane is of an elastomeric material.

EXAMPLE 13

The method of any one of examples 1-12, wherein the housing is configured to form part of an electronics-enabled eyewear device.

EXAMPLE 14

The method of any one of examples 1-13, wherein a molding compatibility between the material of the button membrane and the button frame is greater than a molding compatibility between the material of the button membrane and the housing.

EXAMPLE 15

A housing assembly for incorporation in an electronic device, the housing assembly comprising:
a button insert that comprises:
   a button frame that defines an access opening extending therethrough, the button frame being of a substantially rigid plastics material; and
   a button membrane attached to the button frame and covering at least part of the access opening through the button frame, the button membrane being of a resiliently flexible material; and
a molded housing that defines a hollow interior for holding electronics components, the housing having been molded on to the button insert such that a housing wall of the molded housing is bonded to the button frame, the button membrane being located in a button aperture defined by the housing.

EXAMPLE 16

The assembly of example 15, wherein an overmolding connection between the button frame and the housing is such that the button insert closes off the button aperture, resisting water ingress into the housing.

EXAMPLE 17

The assembly of example 15 or example 16, wherein the button insert further comprises a hard island bonded to the flexible button membrane to be displaceable, responsive to resilient deformation of the button membrane, at least partially through the access opening defined by the button frame the hard island being of a substantially rigid plastics material.

EXAMPLE 18

The assembly of example 17, further comprising a button cap attached to the hard island for receiving manual user actuation.

EXAMPLE 19

The assembly of example 18, wherein the button cap is bonded to the hard island.

EXAMPLE 20

The assembly of any one of examples 15-19, wherein the assembly is a product of the method of any one of examples 1-14.

EXAMPLE 21

An electronic device that comprises:
the housing assembly of any one of examples 15-20; and
electronics components located in the hollow interior of the housing, the electronics components being configured to be operable by resilient deformation of the button membrane responsive to manual actuation of a button mechanism of which the button insert forms part.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. A method comprising:
   forming a composite button insert that comprises:
      a button frame that defines an access opening extending therethrough, the button frame being of a substantially rigid plastics material; and
      a button membrane attached to the button frame and covering at least part of the access opening through the button frame, the button membrane being of a resiliently flexible material; and
   overmolding a housing for electronics components on to the composite button insert such that the housing is bonded to the button frame, with the button membrane being located in a button aperture defined by the housing, the button aperture being closed off by the composite button insert.

2. The method of claim 1, wherein the composite button insert is substantially watertight, and wherein the overmolding of the housing on to the composite button insert establishes a substantially watertight connection between the composite button insert and the housing, so that composite button insert seals off the button aperture of the housing.

3. The method of claim 1, wherein the forming of the composite button insert comprises:
   molding the button frame; and
   overmolding the button membrane on to the button frame.

4. The method of claim 1, wherein the composite button insert is formed in a co-molding operation in which the button frame is molded and in which the button membrane is overmolded on to the button frame.

5. The method of claim 4, wherein the co-molding operation is such that the composite button insert further comprises a hard island bonded to the flexible button membrane to be displaceable relative to the button frame responsive to resilient deformation of the button membrane, the hard island being of a substantially rigid plastics material and being located in register with the button aperture defined by the housing.

6. The method of claim 5, further comprising attaching a button cap to the hard island, the button cap providing an interface for manual user interaction.

7. The method of claim 6, wherein the attaching of the button cap to the hard island comprises an ultrasonic bonding operation.

8. The method of claim 6, wherein attachment of the button cap to the hard island comprises forming an adhesive bond between the button cap and the hard island.

9. The method of claim 1, wherein the button frame has a substantially flat body portion, the access opening being defined by the body portion and being substantially circular.

10. The method of claim 1, wherein:
    the button frame defines a pair of oppositely facing major faces connected by a peripherally extending edge face, the pair of major faces comprising an outer face that is bonded to a wall of the housing in the overmolding of the housing on to the composite button insert, and an inner face directed to an interior of the housing; and
    wherein the inner face of the button frame defines a mounting formation configured for the attachment of one or more electronics components in the housing to the button frame.

11. The method of claim 10, wherein the mounting formation comprises a heat stake configured for connection to a printed circuit board (PCB).

12. The method of claim 1, wherein the membrane is of an elastomeric material.

13. The method of claim 1, wherein the housing is configured to form part of an electronics-enabled eyewear device.

14. The method of claim 1, wherein a molding compatibility between the material of the button membrane and the button frame is greater than a molding compatibility between the material of the button membrane and the housing.

15. A housing assembly for incorporation in an electronic device, the housing assembly comprising:
    a composite button insert that comprises:
    a button frame that defines an access opening extending therethrough, the button frame being of a substantially rigid plastics material; and
    a button membrane attached to the button frame and covering at least part of the access opening through the button frame, the button membrane being of a resiliently flexible material; and
a molded housing that defines a hollow interior for holding electronics components, the housing having been molded on to the composite button insert such that a housing wall of the molded housing is bonded to the button frame, the button membrane being located in a button aperture defined by the housing.

16. The assembly of claim 15, wherein an overmolding connection between the button frame and the housing is such that the composite button insert closes off the button aperture, resisting water ingress into the housing.

17. The assembly of claim 15, wherein the composite button insert further comprises a hard island bonded to the flexible button membrane to be displaceable, responsive to resilient deformation of the button membrane, at least partially through the access opening defined by the button frame the hard island being of a substantially rigid plastics material.

18. The assembly of claim 17, further comprising a button cap attached to the hard island for receiving manual user actuation.

19. The assembly of claim 18, wherein the button cap is bonded to the hard island.

20. An electronic device that comprises:
the housing assembly of any one of claim 15-19; and
electronics components located in the hollow interior of the housing, the electronics components being configured to be operable by resilient deformation of the button membrane responsive to manual actuation of a button mechanism of which the composite button insert forms part.

* * * * *